(12) United States Patent
Ponti et al.

(10) Patent No.: US 12,138,890 B2
(45) Date of Patent: Nov. 12, 2024

(54) MULTILAYER BIODEGRADABLE FILM

(71) Applicant: NOVAMONT S.P.A., Novara (IT)

(72) Inventors: Roberto Ponti, Marano Ticino (IT); Claudio Russo, Novara (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 18/047,307

(22) Filed: Oct. 18, 2022

(65) Prior Publication Data

US 2023/0311460 A1   Oct. 5, 2023

Related U.S. Application Data

(63) Continuation of application No. 16/309,560, filed as application No. PCT/EP2017/064392 on Jun. 13, 2017, now abandoned.

(30) Foreign Application Priority Data

Jun. 13, 2016 (IT) ........................ 102016000060486

(51) Int. Cl.

| | |
|---|---|
| B32B 27/08 | (2006.01) |
| A01G 13/02 | (2006.01) |
| B32B 7/04 | (2019.01) |
| B32B 27/18 | (2006.01) |
| B32B 27/20 | (2006.01) |
| B32B 27/22 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B32B 27/40 | (2006.01) |
| B32B 27/42 | (2006.01) |
| C08J 5/18 | (2006.01) |
| C08L 67/02 | (2006.01) |

(52) U.S. Cl.
CPC .......... *B32B 27/08* (2013.01); *A01G 13/0275* (2013.01); *B32B 7/04* (2013.01); *B32B 27/18* (2013.01); *B32B 27/20* (2013.01); *B32B 27/22* (2013.01); *B32B 27/285* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 27/42* (2013.01); *C08J 5/18* (2013.01); *C08L 67/02* (2013.01); *B32B 2250/24* (2013.01); *B32B 2264/10* (2013.01); *B32B 2264/102* (2013.01); *B32B 2264/104* (2013.01); *B32B 2270/00* (2013.01); *B32B 2307/21* (2013.01); *B32B 2307/3065* (2013.01); *B32B 2307/50* (2013.01); *B32B 2307/5825* (2013.01); *B32B 2307/7163* (2013.01); *B32B 2307/732* (2013.01); *B32B 2439/70* (2013.01); *B32B 2553/00* (2013.01); *C08J 2367/02* (2013.01); *C08J 2403/02* (2013.01); *C08J 2425/14* (2013.01); *C08J 2467/02* (2013.01); *C08J 2467/04* (2013.01); *C08L 2201/06* (2013.01); *C08L 2203/16* (2013.01); *C08L 2205/025* (2013.01); *C08L 2205/03* (2013.01); *C08L 2205/035* (2013.01); *C08L 2310/00* (2013.01); *Y10T 428/1334* (2015.01); *Y10T 428/1352* (2015.01)

(58) Field of Classification Search
CPC combination set(s) only.
See application file for complete search history.

(56) References Cited

U.S. PATENT DOCUMENTS

| | | | |
|---|---|---|---|
| 2004/0068058 A1* | 4/2004 | Bastioli | ...................... C08J 5/18 525/418 |
| 2007/0042207 A1 | 2/2007 | Berger et al. | |
| 2009/0324917 A1* | 12/2009 | Wang | ...................... C08L 67/04 524/401 |

(Continued)

FOREIGN PATENT DOCUMENTS

| | | | | |
|---|---|---|---|---|
| CA | 2928718 A1 * | 4/2015 | ........... | B29C 48/022 |
| JP | 2001 071440 A | 3/2001 | | |

(Continued)

OTHER PUBLICATIONS

BASF SE, Ecoflex F Blend C1200 product information, Jan. 2013, available online at https://documents.basf.com/c32f5c099d8e29ac42869b9755 1 7bdbdda6e62f4/ecoflex_F_Blend_C1200.pdf?response-content-disposition=inline (Year: 2013).*

(Continued)

*Primary Examiner* — Michael C Romanowski
(74) *Attorney, Agent, or Firm* — POLSINELLI PC

(57) ABSTRACT

A multilayer film comprising two layers, A and B, having a A/B/A arrangement, wherein layers A and B differ from each other. Layer A comprises an aliphatic and/or aliphatic-aromatic biodegradable polyester or a polyvinyl alcohol or copolymers thereof and does not contain starch. Layer B comprises 30-95% by weight of at least an aliphatic-aromatic polyester (AAPE), 0.1-50% by weight of at least a polymer of natural origin, and 1-40% by weight of at least a polyhydroxyalkanoate (PHA). The multilayer biodegradable film which is particularly suitable for the manufacture of packaging and has appreciable optical transparency properties in addition to high level mechanical properties.

18 Claims, No Drawings

(56) References Cited

U.S. PATENT DOCUMENTS

| | | | | |
|---|---|---|---|---|
| 2011/0237743 | A1* | 9/2011 | Ren | C08J 5/18 528/301 |
| 2012/0178896 | A1 | 7/2012 | Bastioli et al. | |
| 2012/0220680 | A1* | 8/2012 | Bastioli | C08L 67/02 524/21 |
| 2013/0029124 | A1* | 1/2013 | Loos | C08K 3/26 524/425 |
| 2013/0217836 | A1* | 8/2013 | Bastioli | C08J 5/18 528/302 |
| 2015/0218368 | A1* | 8/2015 | Bussmann | C08L 67/04 428/220 |
| 2016/0060451 | A1* | 3/2016 | Schmidt | C08L 67/02 524/47 |

FOREIGN PATENT DOCUMENTS

| | | | |
|---|---|---|---|
| JP | 2002256098 A | * | 9/2002 |
| JP | 2012 076443 A | | 4/2012 |

OTHER PUBLICATIONS

JP Office Action issued Feb. 16, 2021 in counterpart Application No. JP 2018-565017.

Wagner, John, R. Ed. Multilayer Flexible Packaging, 2010, Elsevier, Oxford, UK, pp. 231-236. (Year: 2010).

Abstract for JP-2001 071440-A - XP 002765745.

BASF SE, Ecoflex F Blend C1200 product information, Jan. 2013, available online at https://docurnents.basf.corn/c32f5c099d8e29ac42869b975517bdbdda6e62f4/ecoflex F Blend C1200.pdf?response-content-disposition=inline (Year: 2013).

Hae Youn Park, "Modification of Physical Properties of PBAT by Using TPS", International Proceedings of Chemical, Biological and Environmental Engineering, (2012), pp. 67-71, XP055406198.

* cited by examiner

MULTILAYER BIODEGRADABLE FILM

CROSS REFERENCE TO RELATED APPLICATIONS

This application claims priority to and is a continuation of U.S. patent application Ser. No. 16/309,560, filed on Jun. 13, 2017, which is the National Phase of Application No. PCT/EP2017/064392 filed Jun. 13, 2017, which claims priority to Application No. 102016000060486 filed in Italy on Jun. 13, 2016 under 35 U.S.C. § 119. The entire contents of each application are hereby incorporated by reference.

DESCRIPTION

This invention relates to a multilayer biodegradable film that is particularly suitable for use in the manufacture of packaging of various kinds, in particular bags for the carrying of goods and bags for food packaging such as bags for fruit and vegetables. In addition to having high level mechanical properties, in particular a high elastic modulus, the said films have appreciable optical transparency properties.

The production of packaging, in particular bags for food packaging such as bags for fruit and vegetables, requires the use of films which combine good mechanical properties with other properties that are positive for the consumer, such as in particular optical transparency properties which enable consumers to use packaging by identifying an object contained within from the outside.

In the biodegradable packaging sector, in addition to mechanical and optical problems, there is also a need to make use of materials that are able to degrade once they have reached the end of their primary use without giving rise to an accumulation of wastes in the environment. The development of biodegradable films combining these different properties is in fact a challenge requiring that different needs, which are often very inconsistent with each other, be balanced. In fact, although particular standards for mechanical properties and biodegradability can be achieved by making use of compositions of materials that share each of the final properties of the film according to their different characteristics, achieving high optical transparency properties is very often impeded specifically by the heterogeneous nature of the said compositions. For manufacturers of biodegradable packaging films this means that they must decide whether to use a film having high level mechanical and biodegradability properties and non-optimum optical transparency properties or vice versa make use of aspects associated with the optical properties of the packaging, thereby accepting lesser performance in terms of mechanical and biodegradability properties.

If therefore it were possible to develop a film capable of balancing these opposite requirements, one therefore characterised by high level biodegradability and mechanical properties, in particular a high elastic modulus, and appreciable optical transparency properties, this would make it possible to overcome the present problems described above.

This invention addresses this problem and presents a solution to it that is capable of suitably balancing these different requirements. In particular this invention relates to a multilayer film comprising at least one first layer A and at least one second layer B, wherein the layer A and layer B are different from each other, in which layer A comprises a biodegradable aliphatic and/or aliphatic-aromatic polyester or a polyvinyl alcohol or their copolymers, and in which layer B comprises:

i) 30-95% by weight, preferably 50-85%, with respect to the sum of components i.-v., of at least one polyester comprising:
  a) a dicarboxylic component comprising, with respect to the total dicarboxylic component:
    a1) 35-70% by moles, preferably 40-60% by moles, more preferably 45-60% by moles, of units deriving from at least one aromatic dicarboxylic acid;
    a2) 65-30% by moles, preferably 60-40% by moles, more preferably 55-40% by moles, of units deriving from at least one saturated aliphatic dicarboxylic acid;
    a3) 0-5% by moles of units deriving from at least one unsaturated aliphatic dicarboxylic acid;
  b) a diol component comprising, with respect to the total diol component:
    b1) 95-100% by moles of units deriving from at least one saturated aliphatic diol;
    b2) 0-5% by moles of units deriving from at least one unsaturated aliphatic diol;
ii) 0.1-50% by weight, preferably 5-40% by weight, with respect to the sum of components i.-v., of at least one polymer of natural origin;
iii) 1-40% by weight, preferably 2-30% by weight, with respect to the sum of components i.-v., of at least one polyhydroxyalkanoate;
iv) 0-15% by weight, with respect to the sum of components i.-v., of at least one inorganic filler;
v) 0-5% by weight, preferably 0-0.5% by weight, with respect to the sum of components i.-v., of at least one cross-linking agent and/or chain extender comprising at least one compound having two and/or more functional groups including isocyanate, peroxide, carbodiimide, isocyanurate, oxazoline, epoxide, anhydride or divinylether groups and mixtures thereof.

One particular characteristic of the multilayer film according to this invention is that its layer structure comprises at least one layer comprising an aliphatic-aromatic and/or aliphatic biodegradable polyester or a polyvinyl alcohol or their copolymers (layer A) and at least one layer comprising a polymer composition comprising components i.-v. (layer B). Surprisingly it has been discovered that a multilayer film having this combination of materials has extraordinarily good mechanical, biodegradability and optical properties, rendering it suitable for the production of packaging of various kinds.

In particular, layer B of the multilayer film according to this invention structurally comprises a continuous phase and a dispersed phase capable of rendering the film rapidly biodegradable under industrial composting conditions and more preferably in home composting according to standard UNI11355. The said film also has high level mechanical properties and is extremely thin; if for example in the form of bags not more than 50 cm tall, not more than 40 cm wide (with or without gussets) and in the case of bags with handles having handles of width between 5 and 3 cm, and thickness of less than 15 μm and more preferably less than 12 μm, the bags are capable of supporting a weight of at least 3 kg, and even more preferably at least 4 kg under jogging test conditions. By way of example one type of manual jogging test may be considered to be lifting the bag 40 cm from the ground 10 consecutive times without giving rise to any tear. Although the structure of individual layer B has optical properties that are significantly poorer than those of the non-biodegradable materials widely used for the production of packaging, such as for example HDPE, the multilayer film according to this invention has optical properties similar to those of HDPE because of its structure, which provides for a combination of at least one layer A and at least one layer of B, while at the same time maintaining the biodegradability characteristics of layer B (industrial composting and more preferably home compostability and/or dispersability in mechanical mixing processes preceding treatments involving anaerobiosis). In particular the multilayer film has optical transmission properties of above 90%, preferably above 91%, Haze below 65%, preferably below 55%, and clarity of above 20%, preferably above 40%.

This invention also relates to packaging of various kinds, in particular bags for the carrying of goods and bags for food packaging such as bags for food and vegetables comprising the said multilayer film.

The multilayer film according to this invention comprises at least one layer A and at least one layer of B, preferably characterised by a mutual arrangement selected from A/B and A/B/A.

Layer A

As far as layer A is concerned, this comprises at least one aliphatic and/or aliphatic-aromatic polyester or a polyvinyl alcohol or their copolymers. In the case of an aliphatic-aromatic polyester, this preferably comprises:
  c) a dicarboxylic component comprising, with respect to the total dicarboxylic component:
    c1) 35-70% by moles, preferably 40-60% in moles, more preferably 45-60% by moles, of units deriving from at least one aromatic dicarboxylic acid;
    c2) 65-30% by moles, preferably 60-40% by moles, more preferably 55-40% by moles, of units deriving from at least one saturated aliphatic dicarboxylic acid;
    c3) 0-5% by moles of units deriving from at least one unsaturated aliphatic dicarboxylic acid;
  d) a diol component comprising, with respect to the total diol component:
    d1) 95-100% by moles of units deriving from at least one saturated aliphatic diol;
    d2) 0-5% by moles of units deriving from at least one unsaturated aliphatic diol.

The aromatic dicarboxylic acids in component c1 are preferably selected from aromatic dicarboxylic acids of the phthalic acid type, preferably terephthalic acid or isophthalic acid, more preferably terephthalic acid, and heterocyclic dicarboxylic aromatic compounds, preferably 2,5-furandicarboxylic acid, 2,4-furandicarboxylic acid, 2,3-furandicarboxylic acid, 3,4-furandicarboxylic acid, more preferably 2,5-furandicarboxylic acid, their esters, salts and mixtures. In a preferred embodiment the said aromatic dicarboxylic acids comprise:
  from 1 to 99% by moles, preferably from 5 to 95% and more preferably from 10 to 80%, of terephthalic acid, its esters or salts;
  from 99 to 1% by moles, preferably from 95 to 5% and more preferably from 90 to 20%, of 2,5-furandicarboxylic acid, its esters or salts.

The saturated aliphatic dicarboxylic acids in component $c_2$ are preferably selected from saturated $C_2$-$C_{24}$, preferably $C_4$-$C_{13}$, more preferably $C_4$-$C_{11}$ dicarboxylic acids, their $C_1$-$C_{24}$, preferably $C_1$-$C_4$, alkyl esters, their salts and mixtures thereof. Preferably the saturated aliphatic dicarboxylic acids are selected from succinic acid, 2-ethylsuccinic acid, glutaric acid, 2-methylglutaric acid, adipic acid, pimelic acid, suberic acid, azelaic acid, sebacic acid, undecanedioic acid, dodecanedioic acid, brassylic acid, hexadecanedioic acid, octadecanedioic acid and their $C_{1-24}$ alkyl esters. In a preferred embodiment of this invention the saturated aliphatic dicarboxylic acid comprise mixtures comprising at least 50% by moles, preferably more than 60% by moles, more preferably more than 65% by moles, of succinic acid, adipic acid, azelaic acid, sebacic acid, brassylic acid, their $C_1$-$C_{24}$, preferably $C_1$-$C_4$, esters, and mixtures thereof. In a particularly preferred embodiment the said mixtures comprise or consist of adipic acid and azelaic acid and contain azelaic acid in a quantity of between 5 and 40% by moles, more preferably between 10 and 35% by moles of azelaic acid with respect to the sum of adipic acid and azelaic acid.

The unsaturated aliphatic dicarboxylic acids in component c3 are preferably selected from itaconic acid, fumaric acid, 4-methylene-pimelic acid, 3,4-bis(methylene)nonandioic acid, 5-methylene-nonandioic acid, their $C_1$-$C_{24}$, preferably $C_1$-$C_4$, alkyl esters, their salts and mixtures thereof. In a preferred embodiment of this invention the unsaturated aliphatic dicarboxylic acids comprise mixtures comprising at least 50% by moles, preferably more than 60% by moles, more preferably more than 65% by moles, of itaconic acid and its $C_1$-$C_{24}$, preferably $C_1$-$C_4$, esters. More preferably the unsaturated aliphatic dicarboxylic acids consist of itaconic acid.

As far as the saturated aliphatic diols in component d1 are concerned, these are preferably selected from 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohaxanedimethanol, neopentylglycol, 2-methyl-1,3-propanediol, dianhydrosorbitol, dianhydromannitol, dianhydroiditol, cyclohexanediol, cyclohexanmethanediol, dialkyleneglycols and polyalkylene glycols having a molecular weight of 100-4000, such as for example polyethylene glycol, polypropylene glycol and mixtures thereof. Preferably the diol component comprises at least 50% by moles of one or more diols selected from 1,2-ethanediol, 1,3-propanediol, 1,4-butanediol. More preferably the diol component comprises or consists of 1,4-butanediol.

As far as the unsaturated aliphatic diols in component d2 are concerned, these are preferably selected from cis 2-buten-1,4-diol, trans 2-buten-1,4-diol, 2-butyn-1,4-diol, cis 2-penten-1,5-diol, trans 2-penten 1,5 diol, 2-pentyn 1,5 diol, cis 2-hexen-1,6-diol, trans 2-hexen-1,6-diol, 2-hexyn-1,6-diol, cis 3-hexen-1,6-diol, trans 3-hexen-1,6-diol, 3-hexyn-1,6-diol.

In the case of an aliphatic polyester, this preferably comprises:
  e) a dicarboxylic component comprising, with respect to the total dicarboxylic component:
    e1) 95-100% by moles of units deriving from at least one aliphatic dicarboxylic acid;
    e2) 0-5% by moles of units deriving from at least one unsaturated aliphatic dicarboxylic acid;
  f) a diol component comprising, with respect to the total diol component:
    f1) 95-100% by moles of units deriving from at least one saturated aliphatic diol;
    f2) 0-5% by moles of units deriving from at least one unsaturated aliphatic diol.

The saturated aliphatic dicarboxylic acids in component e1 are preferably selected from saturated $C_2$-$C_{24}$, preferably $C_4$-$C_{13}$, more preferably $C_4$-$C_{11}$ dicarboxylic acids, their $C_1$-$C_{24}$, preferably $C_1$-$C_4$, alkyl esters, their salts and mixtures thereof. Preferably the saturated aliphatic dicarboxylic acids are selected from succinic acid, 2-ethylsuccinic acid, glutaric acid, 2-methylglutaric acid, adipic acid, pimelic acid, suberic acid, azelaic acid, sebacic acid, undecanedioic acid, dodecanedioic acid, brassylic acid, hexadecanedioic acid, octadecanedioic acid and their $C_{1-24}$ alkyl esters.

The unsaturated aliphatic dicarboxylic acids in component e2 are preferably selected from itaconic acid, fumaric acid, 4-methylene-pimelic acid, 3,4-bis(methylene)nonandioic acid, 5-methylene-nonandioic acid, their $C_1$-$C_{24}$, preferably $C_1$-$C_4$, alkyl esters, their salts and mixtures thereof. In a preferred embodiment of this invention the unsaturated aliphatic dicarboxylic acids comprise mixtures comprising at least 50% by moles, preferably more than 60% by moles, more preferably more than 65% by moles, of itaconic acid and its $C_1$-$C_{24}$, preferably $C_1$-$C_4$, esters. More preferably the unsaturated aliphatic dicarboxylic acids consist of itaconic acid.

As far as the saturated aliphatic diols in component f1 are concerned, these are preferably selected from 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohaxanedimethanol, neopentylglycol, 2-methyl-1,3-propanediol, dianhydrosorbitol, dianhydromannitol, dianhydroiditol, cyclohexanediol, cyclohexanmethanediol, dialkyleneglycols and polyalkylene glycols having a molecular weight of 100-4000, such as for example polyethylene glycol, polypropylene glycol and mixtures thereof. Preferably the diol component comprises at least 50% by moles of one or more diols selected from 1,2-ethanediol, 1,3-propanediol, 1,4-butanediol. More preferably the diol component comprises or consists of 1,4-butanediol.

As far as the unsaturated aliphatic diols in component f2 are concerned, these are preferably selected from cis 2-buten-1,4-diol, trans 2-buten-1,4-diol, 2-butyn-1,4-diol, cis 2-penten-1,5-diol, trans 2-penten 1,5 diol, 2-pentyn 1,5 diol, cis 2-hexen-1,6-diol, trans 2-hexen-1,6-diol, 2-hexyn-1,6-diol, cis 3-hexen-1,6-diol, trans 3-hexen-1,6-diol, 3-hexyn-1,6-diol.

The Mn molecular weight of the said aliphatic and/or aliphatic-aromatic polyester in layer A is preferably ≥20000, more preferably ≥40000. As far as the polydispersity index of the molecular weights, Mw/Mn, is concerned, this is instead preferably between 1.5 and 10, more preferably between 1.6 and 5, and even more preferably between 1.8 and 2.7.

The $M_n$ and $M_w$ molecular weights may be measured using Gel Permeation Chromatography (GPC). The determination may be performed with the chromatography system held at 40° C., using a set of two columns in series (particle diameters 5 µm and 3 µm with mixed porosity), a refractive index detector, chloroform as eluent (flow 0.5 ml/min) and using polystyrene as the reference standard.

The terminal acid groups content of the said aliphatic and/or aliphatic-aromatic polyester in layer A is preferably below 100 meq/kg, preferably below 60 meq/kg and even more preferably below 40 meq/kg.

The terminal acid groups content may be measured as follows: 1.5-3 g of polyester are placed in a 100 ml flask together with 60 ml of chloroform. After the polyester has completely dissolved 25 ml of 2-propanol are added, and then 1 ml of deionised water immediately before analysis. The solution so obtained is titrated against a previously standardised solution of NaOH in ethanol. An appropriate indicator is used to determine the end point of the titration, such as for example a glass electrode for acid-base titrations in non-aqueous solvents. The terminal acid groups content is calculated on the basis of the consumption of NaOH solution in ethanol using the following equation:

$$\text{Terminal acid groups content (meq/kg polymer)} = \frac{\lfloor (V_{eq} - V_b) \cdot T \rfloor \cdot 1000}{P}$$

in which: $V_{eq}$=ml of NaOH in ethanol at the end point of the titration of the sample;
$V_b$=ml of solution of NaOH in ethanol required to reach a pH of 9.5 in the blank titration;
T=concentration of the NaOH solution in ethanol expressed as moles/litre;
P=weight of the sample in grams.

Preferably the said aliphatic and/or aliphatic-aromatic polyester in layer A has an inherent viscosity of more than 0.3 dl/g (measured using an Ubbelohde viscosity meter for solutions of concentration 0.2 g/dl in $CHCl_3$ at 25° C.), preferably between 0.3 and 2 dl/g, more preferably between 0.4 and 1.1 dl/g.

The said aliphatic and/or aliphatic-aromatic polyester in layer A is biodegradable. In the meaning of this invention, by biodegradable polymer is meant a biodegradable polymer according to standard EN 13432.

The said aliphatic and/or aliphatic-aromatic polyester in layer A can be synthesised according to any of the processes known in the state of the art. In particular it may advantageously be obtained using a poly condensation reaction.

Advantageously the synthesis process may be performed in the presence of a suitable catalyst. By way of suitable catalysts mention may for example be made of organometallic compounds of tin, for example stannoic acid derivatives, titanium compounds, for example orthobutyl titanate, aluminium compounds, for example triisopropyl aluminium, compounds of antimony and zinc and zirconium and mixtures thereof.

In another embodiment of this invention the said aliphatic polyester in layer A is the polyester of a hydroxy acid, preferably a poly-ε-caprolactone.

In layer A the said at least one aliphatic and/or aliphatic-aromatic polyester is advantageously mixed with one or more other components. In this case layer A comprises a composition comprising at least one aliphatic and/or aliphatic-aromatic polyester or a polyvinyl alcohol or their copolymers and preferably one or more polymers which are not the same as the said aliphatic and/or aliphatic-aromatic polyester or the said polyvinyl alcohol or their copolymers, of synthetic or natural origin, which may or may not be biodegradable, and preferably one or more other components.

As far as the polymers which are not the same as the said aliphatic and/or aliphatic-aromatic polyester or the said polyvinyl alcohol or their copolymers of synthetic or natural origin, whether biodegradable or not, are concerned, these are advantageously selected from the group consisting of polyhydroxyalkanoates, vinyl polymers, diacid diol polyesters other than polyester i., polyamides, polyurethanes, polyethers, polyureas, polycarbonates and mixtures thereof.

In the case of non-biodegradable polymers, these are clearly present in quantities such as not to have a significant effect on the biodegradability of the final product.

In a preferred embodiment said composition in layer A comprises, in addition to the said aliphatic and/or aliphatic-aromatic polyester or the said polyvinyl alcohol or their copolymers, between 1 and 40% by weight and more preferably between 5 and 30% by weight with respect to the total of layer A of at least one polyhydroxyalkanoate more preferably selected from the group consisting of polyesters of lactic acid, poly-ε-caprolactone, polyhydroxybutyrate, polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate. Preferably the said polyhydroxyalkanoate comprises at least 80% by weight of one or more polyesters of lactic acid.

In a preferred embodiment the lactic acid polyesters are selected from the group consisting of poly-L-lactic acid, poly-D-lactic acid, the poly-D-L-lactic acid stereo complex, copolymers comprising more than 50% by moles of the said lactic acid polyesters, or mixtures thereof. Particularly preferred are lactic acid polyesters containing at least 95% by weight of repetitive units deriving from L-lactic or D-lactic acid or combinations thereof, having an Mw molecular weight of more than 50000 and a shear viscosity of between 50 and 500 Pa·s, preferably 100-300 Pa·s (measured according to standard ASTM D3835 at T=190° C., shear rate=1000 $s^{-1}$ D=1 mm, L/D=10).

In a particularly preferred embodiment of the invention the lactic acid polyester comprises at least 95% by weight of units deriving from L-lactic acid, ≤5% of repetitive units deriving from D-lactic acid, has a melting point within the range 135-180° C., a glass transition temperature (Tg) in the range 55-65° C. and an MFR (measured in accordance with standard ISO 1133-1 at 190° C. and 2.16 kg) within the range 1-50 g/10 min. Commercial examples of lactic acid polyesters having these properties are for example the products of the Ingeo™ Biopolymer 4043D, 3251D and 6202D make.

Among the vinyl polymers those preferred are polyethylene, polypropylene, their copolymers, polyvinyl alcohol, polyvinyl acetate, polyethylvinyl acetate and polyethylene vinyl alcohol, polystyrene, chlorinated vinyl polymers and polyacrylates.

Among the chlorinated vinyl polymers, those which are intended to be included here, in addition to polyvinyl chloride are polyvinylidene chloride, polyethylene chloride, poly(vinyl chloride-vinyl acetate), poly(vinyl chloride-ethylene), poly(vinyl chloride-propylene), poly(vinyl chloride-styrene), poly(vinyl chloride-isobutylene) and copolymers in which polyvinyl chloride represents more than 50% by moles. The said polymers may be random, block or alternating copolymers.

As far as the polyamides in the composition according to this invention are concerned, these are preferably selected from the group consisting of polyamide 6 and 6,6, polyamide 9 and 9,9, polyamide 10 and 10,10, polyamide 11 and 11,11, polyamide 12 and 12,12 and their combinations of the 6/9, 6/10, 6/11 and 6/12 type, their mixtures and both random and block copolymers.

Preferably the polycarbonates of the composition according to this invention are selected from the group consisting of polyalkylene carbonates, more preferably polyethylene carbonates, polypropylene carbonates, polybutylene carbonates, their mixtures and random and block copolymers.

Among the polyethers, those preferred are those selected from the group consisting of polyethylene glycols, polypropylene glycols, polybutylene glycols, their copolymers and their mixtures having molecular weights from 70000 to 500000.

As far as the diacid diol polyesters which are not the same as the aliphatic and/or aliphatic-aromatic polyester in layer A are concerned, these preferably comprise:
  g) a dicarboxylic component comprising, with respect to the total dicarboxylic component:
    g1) 20-100% by moles of units deriving from at least one aromatic dicarboxylic acid,
    g2) 0-80% by moles of units deriving from at least one saturated aliphatic dicarboxylic acid,
    g3) 0-5% by moles of units deriving from at least one unsaturated aliphatic dicarboxylic acid;
  h) a diol component comprising, with respect to the total diol component:
    h1) 95-100% by moles of units deriving from at least one saturated aliphatic diol;
    h2) 0-5% by moles of units deriving from at least one unsaturated aliphatic diol.

Preferably aromatic dicarboxylic acids g1, saturated aliphatic dicarboxylic acids g2, unsaturated aliphatic dicarboxylic acids g3, saturated aliphatic diols h1 and unsaturated aliphatic diols h2 for the said polyesters are selected from those described above for the aliphatic-aromatic polyester in layer A according to this invention.

At least one cross-linking agent and/or chain extender may also be present in the composition of layer A in order to improve stability to hydrolysis. The said cross-linking agent and/or chain extender is selected from compounds having two and/or multiple functional groups including isocyanate, peroxide, carbodiimide, isocyanurate, oxazoline, epoxy, anhydride or divinylether groups or mixtures thereof. Preferably the cross-linking agent and/or chain extender comprises at least one compound having two and/or multiple functional groups including isocyanate groups. More preferably the cross-linking agent and/or chain extender comprises at least 25% by weight of one or more compounds having two and/or multiple functional groups including isocyanate groups. Particularly preferred are mixtures of compounds having two and/or multiple functional groups including isocyanate groups with compounds having two and/or multiple functional groups including epoxy groups, even more preferably comprising at least 75% by weight of compounds having two and/or multiple functional groups including isocyanate groups.

The compounds having two and multifunctional groups including isocyanate groups are preferably selected from p-phenylene diisocyanate, 2,4-toluene diisocyanate, 2,6-toluene diisocyanate, 4,4-diphenylmethane-diisocyanate, 1,3-phenylene-4-chloro diisocyanate, 1,5-naphthalene diisocyanate, 4,4-diphenylene diisocyanate, 3,3'-dimethyl-4,4-diphenylmethane diisocyanate, 3-methyl-4,4'-diphenylmethane diisocyanate, diphenylester diisocyanate, 2,4-cyclohexane diisocyanate, 2,3-cyclohexane diisocyanate, 1-methyl 2,4-cyclohexyl diisocyanate, 1-methyl 2,6-cyclohexyl diisocyanate, bis-(isocyanate cyclohexyl) methane, 2,4,6-toluene triisocyanate, 2,4,4-diphenylether triisocyanate, polymethylene-polyphenyl-polyisocyanates, methylene diphenyl diisocyanate, triphenylmethane triisocyanate, 3,3'ditolylene-4,4-diisocyanate, 4,4'-methylenebis (2-methyl-phenyl isocyanate), hexamethylene diisocyanate, 1,3-cyclohexylene diisocyanate, 1,2-cyclohexylene diisocyanate and their mixtures. In a preferred embodiment the compound containing isocyanate groups is 4,4-diphenylmethane-diisocyanate.

As far as the compounds having two and/or multiple functional groups including peroxide groups are concerned, these are preferably selected from benzoyl peroxide, lauroyl peroxide, isononanoyl peroxide, di-(t-butylperoxyisopropyl)

benzene, t-butyl peroxide, dicumyl peroxide, alpha,alpha-di(t-butylperoxy)diisopropylbenzene, 2,5-dimethyl-2,5-di(-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxy dicarbonate, dicetyl peroxydicarbonate, dimyristyl peroxydicarbonate, 3,6,9-triethyl-3,6,9-trimethyl-1,4,7-triperoxonane, di(2-ethylhexyl) peroxydicarbonate and mixtures thereof.

The compounds having two and/or multiple functional groups including carbodiimide groups which are preferably used in the composition according to this invention are selected from poly(cyclooctylene carbodiimide), poly(1,4-dimethylencyclohexylene carbodiimide), poly(cyclohexylene carbodiimide), poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetraisopropyldiphenylene carbodiimide) (Stabaxol® D), poly(2,4,6-triisopropyl-1,3-phenylene carbodiimide) (Stabaxol® P-100), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof.

Examples of compounds having two and multiple functional groups including epoxy groups which may advantageously be used in the composition according to this invention are all the polyepoxides from epoxidated oils and/or from styrene-glycidylether-methylmethacrylate or glycidylether-methylmethacrylate, included within a range of molecular weights between 1000 and 10000 and having an epoxide number per molecule within the range 1 to 30 and preferably between 5 and 25, the selected epoxides in the group comprising: diethyleneglycol diglycidylether, polyethyleneglycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxides, 1,4-cyclohaxanedimethanol diglycidyl ether, glycidyl 2-methylphenyl ether, glycerol propoxylatotriglycidyl ether, 1,4-butanediol diglycidyl ether, sorbitol polyglycidyl ether, glycerol diglycidyl ether, tetraglycidyl ethers of meta-xylenediamine and diglycidyl ether or bisphenol A and mixtures thereof.

Together with the compounds having two and multiple functional groups including isocyanate, peroxide, carbodiimide, isocyanurate, oxazoline, epoxy, anhydride and divinylether groups such as for example those described above, catalysts may also be used to raise the reactivity of the reactive groups. In the case of the polyepoxides, salts of fatty acids, even more preferably calcium and zinc stearates, may preferably be used.

In a particularly preferred embodiment of the invention the cross-linking agent and/or chain extender for the composition in layer A comprises compounds including isocyanate groups, preferably 4,4-diphenylmethane-diisocyanate, and/or containing carbodiimide groups, and/or containing epoxy groups, preferably of the styrene-glycidylether-methylmethacrylate type.

A filler may also be present in the composition of layer A, up to 10% by weight with respect to the total of layer A.

The composition of layer A of the multilayer film according to the present invention does not contain starch.

In addition to the abovementioned components the composition in layer A preferably also comprises at least one other component selected from the group consisting of plasticisers, UV stabilisers, lubricants, nucleating agents, surfactants, antistatic agents, pigments, flame-retardant agents, compatibilising agents, lignin, organic acids, anti-oxidants, anti-mould agents, waxes, process coadjuvants and polymer components preferably selected from the group consisting of vinyl polymers, diacid diol polyesters which are not the aliphatic-aromatic polyesters described above, polyamides, polyurethanes, polyethers, polyureas or polycarbonates.

As far as the plasticisers are concerned, there are preferably present in the composition of layer A according to this invention, one or more plasticisers selected from the group comprising water, polyols having from 2 to 22 carbon atoms. phthalates, such as for example diisononyl phthalate, trimellitates, such as for example esters of trimellitic acid with $C_4$-$C_{20}$ monoalcohols preferably selected from the group comprising n-octanol and n-decanol, and aliphatic esters having the following structure:

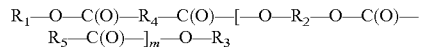

in which:
  $R_1$ is selected from one or more groups comprising H, linear and branched saturated and unsaturated alkyl residues of the $C_1$-$C_{24}$ type, polyol residues esterified with $C_1$-$C_{24}$ monocarboxylic acids;
  $R_2$ comprises —$CH_2$—$C(CH_3)_2$-$CH_2$— and $C_2$-$C_8$ alkylene groups, and comprises at least 50% by moles of the said —$CH_2$—$C(CH_3)_2$-$CH_2$— groups;
  $R_3$ is selected from one or more groups comprising H, linear and branched saturated and unsaturated alkyl residues of the $C1$-$C_{24}$ type, polyol residues esterified with $C1$-$C_{24}$ monocarboxylic acids;
  $R_4$ and $R_5$ are the same or different, comprise one or more $C_2$-$C_{22}$, preferably $C_2$-$C_{11}$, more preferably $C_4$-$C_9$ alkylenes, and comprise at least 50% by moles of $C_7$ alkylenes.
  m is a number of between 1 and 20, preferably 2-10, more preferably 3-7. Preferably, in the said esters at least one of the groups $R_1$ and/or $R_3$ comprises, preferably in quantities ≥10% by moles, more preferably ≥20%, even more preferably ≥25% by moles with respect to the total quantity of $R_1$ and/or $R_3$ groups, polyol residues esterified with at least one $C_1$-$C_{24}$ monocarboxylic acid selected from the group consisting of stearic acid, palmitic acid, 9-ketostearic acid, 10-ketostearic acid and mixtures thereof. Examples of aliphatic esters of this type are described in Italian Patent Application MI2014A000030 and in PCT Applications PCT/EP2015/050336, PCT/EP2015/050338.

When present in layer A the selected plasticisers are preferably present up to 10% by weight with respect to the total weight of the composition of layer A itself.

The lubricants are preferably selected from esters and metal salts of fatty acids such as for example zinc stearate, calcium stearate, aluminium stearate and acetyl stearate. Preferably the composition of layer A according to this invention comprises up to 1% by weight of lubricants, more preferably up to 0.5% by weight with respect to the total weight of the composition of layer A.

Examples of nucleating agents include the sodium salt of saccharine, calcium silicate, sodium benzoate, calcium titanate, boron nitride, isotactic polypropylene, or low molecular weight PLA. These additives are preferably added in quantities up to 10% by weight and more preferably between 2 and 6% by weight with respect to the total weight of the composition. Pigments may also be added if necessary, for example titanium dioxide, clays, copper phthalocyanine, titanium dioxide, silicates, iron oxide and hydroxides, carbon black and magnesium oxide. These additives are preferably added up to 10% by weight.

In a preferred embodiment layer A of a multilayer film according to this invention comprises, with respect to the sum of components i.-v.:
- i) 30-70% by weight of at least one aliphatic-aromatic polyester;
- ii) 20-60% by weight of at least one aliphatic polyester;
- iii) 1-20% by weight of at least one polyhydroxyalkanoate;
- iv) 0-5% by weight, preferably 0-0.5%, of at least one cross-linking agent and/or a chain extender comprising at least one compound having two and/or multiple functional groups including isocyanate, peroxide, carbodiimide, isocyanurate, oxazoline, epoxy, anhydride or divinyl ether groups and mixtures thereof,
- v) 0-10% by weight, preferably 0-5%, of at least one filler.

In a preferred embodiment layer A of a multilayer film according to this invention comprises, with respect to the sum of components i.-v.:
- i) 60-100% by weight of at least one aliphatic-aromatic polyester;
- ii) 0-20% by weight of at least one aliphatic polyester;
- iii) 0-40% by weight of at least one polyhydroxyalkanoate;
- iv) 0-5% by weight, preferably 0-0.5%, of at least one cross-linking agent and/or a chain extender comprising at least one compound having two and/or multiple functional groups including isocyanate, peroxide, carbodiimide, isocyanurate, oxazoline, epoxy, anhydride or divinyl ether groups and mixtures thereof,
- v) 0-10% by weight, preferably 0-5%, of at least one filler.

In a preferred embodiment layer A of a multilayer film according to this invention comprises, with respect to the sum of components i.-v.:
- i) 0-20% by weight of at least one aliphatic-aromatic polyester;
- ii) 60-100% by weight of at least one aliphatic polyester;
- iii) 0-40% by weight of at least one polyhydroxyalkanoate;
- iv) 0-5% by weight, preferably 0-0.5%, of at least one cross-linking agent and/or a chain extender comprising at least one compound having two and/or multiple functional groups including isocyanate, peroxide, carbodiimide, isocyanurate, oxazoline, epoxy, anhydride or divinyl ether groups and mixtures thereof;
- v) 0-10% by weight, preferably 0-5%, of at least one filler.

Layer B

As far as layer B is concerned, this comprises:
- i) 30-95% by weight, preferably 50-85% by weight, with respect to the sum of components i.-v., of at least one polyester comprising:
  - a) a dicarboxylic component comprising, with respect to the total for the dicarboxylic component:
    - a1) 35-70% by moles, preferably 40-60% by moles, more preferably 45-60% by moles, of units deriving from at least one aromatic dicarboxylic acid;
    - a2) 70-35% by moles, preferably 60-40% by moles, more preferably 55-40% by moles, of units deriving from at least one saturated aliphatic dicarboxylic acid;
    - a3) 0-5% by moles of units deriving from at least one unsaturated aliphatic dicarboxylic acid;
  - b) a diol component comprising, with respect to the total for the diol component:
    - b1) 95-100% by moles of units deriving from at least one saturated aliphatic diol;
    - b2) 0-5% by moles of units deriving from at least one unsaturated aliphatic diol;
- ii) 0.1-50% by weight, preferably 5-40% by weight, with respect to the sum of components i.-v., of at least one polymer of natural origin,
- iii) 1-40% by weight, preferably 2-30% by weight, with respect to the sum of components i.-v., of at least one polyhydroxyalkanoate;
- iv) 0-15% by weight, with respect to the sum of components i.-v., of at least one inorganic filler;
- v) 0-5% by weight, preferably 0-0.5% by weight, with respect to the sum of components i.-v., of at least one cross-linking agent and/or chain extender comprising at least one compound having two and/or multiple functional groups including isocyanate, peroxide, carbodiimide, isocyanurate, oxazoline, epoxy, anhydride or divinyl ether groups and mixtures thereof.

The aromatic dicarboxylic acids in component a1 of polyester i. are preferably selected from aromatic dicarboxylic acids of the phthalic acid type, preferably terephthalic acid or isophthalic acid, more preferably terephthalic acid, and heterocyclic dicarboxylic aromatic compounds, preferably 2,5-furandicarboxylic acid, 2,4-furandicarboxylic acid, 2,3-furandicarboxylic acid, 3,4-furandicarboxylic acid, more preferably 2,5-furandicarboxylic acid, their esters, salts and mixtures. In a preferred embodiment the said aromatic dicarboxylic acids comprise:

from 1 to 99% by moles, preferably from 5 to 95% and more preferably from 10 to 80%, of terephthalic acid, its esters or salts;

from 99 to 1% by moles, preferably from 95 to 5% and more preferably from 90 to 20%, of 2,5-furandicarboxylic acid, its esters or salts.

The saturated aliphatic dicarboxylic acids in component a2 of polyester i. are preferably selected from saturated $C_2$-$C_{24}$, preferably $C_4$-$C_{13}$, more preferably $C_4$-$C_{11}$ dicarboxylic acids, their $C_1$-$C_{24}$, preferably $C_1$-$C_4$, alkyl esters, their salts and mixtures thereof. Preferably the saturated aliphatic dicarboxylic acids are selected from succinic acid, 2-ethylsuccinic acid, glutaric acid, 2-methylglutaric acid, adipic acid, pimelic acid, suberic acid, azelaic acid, sebacic acid, undecanedioic acid, dodecanedioic acid, brassylic acid, hexadecanedioic acid, octadecanedioic acid and their $C_{1-24}$ alkyl esters. In a preferred embodiment of this invention the saturated aliphatic dicarboxylic acid comprise mixtures comprising at least 50% by moles, preferably more than 60% by moles, more preferably more than 65% by moles, of succinic acid, adipic acid, azelaic acid, sebacic acid, brassylic acid, their $C_1$-$C_{24}$, preferably $C_1$-$C_4$, esters, and mixtures thereof. In a particularly preferred embodiment the said mixtures comprise or consist of adipic acid and azelaic acid and contain azelaic acid in a quantity of between 5 and 40% by moles, more preferably between 10 and 35% by moles of azelaic acid with respect to the sum of adipic acid and azelaic acid.

The unsaturated aliphatic dicarboxylic acids in component a3 of polyester i. are preferably selected from itaconic acid, fumaric acid, 4-methylene-pimelic acid, 3,4-bis(methylene)nonandioic acid, 5-methylene-nonandioic acid, their $C1$-$C_{24}$, preferably C1.C4, alkyl esters, their salts and mixtures thereof. In a preferred embodiment of this invention the unsaturated aliphatic dicarboxylic acids comprise mixtures comprising at least 50% by moles, preferably more than 60% by moles, more preferably more than 65% by moles, of itaconic acid and its $C1$-$C_{24}$, preferably $C1$-$C_4$, esters. More preferably the unsaturated aliphatic dicarboxylic acid comprise itaconic acid.

As far as the saturated aliphatic diols in component b1 of polyester i. are concerned, these are preferably selected from 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohaxanedimethanol, neopentylglycol, 2-methyl-1,3-propanediol, dianhydrosorbitol, dianhydromannitol, dianhydroiditol, cyclohexanediol, cyclohexanmethanediol, dialkyleneglycols and polyalkylene glycols having a molecular weight of 100-4000, such as for example polyethylene glycol, polypropylene glycol and mixtures thereof. Preferably the diol component comprises at least 50% by moles of one or more diols selected from 1,2-ethanediol, 1,3-propanediol, 1,4-butanediol. More preferably the diol component comprises or consists of 1,4-butanediol.

As far as the unsaturated aliphatic diols in component b2 of polyester i. are concerned, these are preferably selected from cis 2-buten-1,4-diol, trans 2-buten-1,4-diol, 2-butyn-1,4-diol, cis 2-penten 1,5 diol, trans 2-penten 1,5 diol, 2-pentyn 1,5 diol, cis 2-hexen-1,6-diol, trans 2-hexen-1,6-diol, 2-hexyn-1,6-diol, cis 3-hexen-1,6-diol, trans 3-hexen-1,6-diol, 3-hexyn-1,6-diol.

The Mn molecular weight of the polyester i. in layer B is preferably ≥20000, more preferably ≥40000. As far as the polydispersity index of the molecular weights, Mw/Mn, is concerned, this is instead preferably between 1.5 and 10, more preferably between 1.6 and 5, and even more preferably between 1.8 and 2.7.

The $M_n$ and $M_w$ molecular weights may be measured using Gel Permeation Chromatography (GPC). The determination may be performed with the chromatography system held at 40° C., using a set of two columns in series (particle diameters 5 μm and 3 μm with mixed porosity), a refractive index detector, chloroform as eluent (flow 0.5 ml/min) and using polystyrene as the reference standard.

The terminal acid groups content of the polyester i. in layer B is preferably below 100 meq/kg, preferably below 60 meq/kg, and even more preferably below 40 meq/kg.

The terminal acid groups content may be measured using the method described for the aliphatic-aromatic polyester layer A.

Preferably the polyester i. in layer B has an inherent viscosity (measured using an Ubbelohde viscosimeter for solutions of concentration 0.2 g/dl in $CHCl_3$ at 25° C.) of over 0.3 dl/g, preferably between 0.3 and 2 dl/g, more preferably between 0.4 and 1.1 dl/g.

Preferably polyester i. in layer B is biodegradable. For the meaning of this invention by biodegradable polymer is meant a polymer which is biodegradable in accordance with standard EN 13432.

The said polyester i. in layer B can be synthesised according to any of the processes known in the state of the art. In particular it may advantageously be obtained through a poly condensation reaction.

Advantageously the synthesis process may be performed in the presence of a suitable catalyst. By way of suitable catalysts mention may for example be made of organometallic compounds of tin, for example stannoic acid derivatives, titanium compounds, for example orthobutyl titanate, aluminium compounds, for example triisopropyl aluminium, compounds of antimony and zinc and zirconium and mixtures thereof.

The composition of layer B comprises 0.1-50% by weight, preferably 5-40% by weight, with respect to the sum of components i.-v., of at least one polymer of natural origin. In the composition of layer B the polymer of natural origin (component ii.) is advantageously selected from starch, chitin, chitosan, alginates, proteins such as gluten, zein, casein, collagen, gelatin, natural rubbers, rosinic acid and their derivatives. Preferably, in the composition of layer B the polymer of natural origin is starch.

By the term starch is meant all types of starch, that is flour, native starch, hydrolysed starch, destructured starch, gelatinised starch, plasticised starch, thermoplastic starch, biofiller comprising complexed starch or mixtures thereof. Particularly suitable according to the invention are starches such as those from potato, maize, tapioca and peas.

Starches which are capable of easily being destructured or which have high initial molecular weights, such as for example potato or maize starch, have proved to be particularly advantageous.

The starch may be present as such or in a chemically modified form, such as for example in the form of starch esters having a degree of substitution of between 0.2 and 2.5, starch hydroxypropylate or starch modified with fatty chains.

In the case of destructured starch reference is made here to the teaching included in patents EP-0 118 240 and EP-0 327 505, meaning as such starch processed in such a way as to be substantially free from the so-called "Maltese crosses" under an optical microscope in polarised light and the so-called "ghosts" under an optical microscope with phase contrast.

Advantageously the starch is destructured by means of an extrusion process at temperatures of between 110 and 250° C., preferably 130-180° C., preferably at pressures between 0.1 and 7 MPa, preferably 0.3-6 MPa, preferably providing a specific energy of more than 0.1 kWh/kg during the said extrusion.

Destructuring of the starch preferably takes place in the presence of 1-40% by weight with respect to the weight of the starch of one or more plasticisers selected from water and polyols having from 2 to 22 carbon atoms. As far as the water is concerned, this may also be that which is naturally present in the starch. Among the polyols, those preferred are polyols having from 1 to 20 hydroxyl groups containing 2 to 6 carbon atoms, their ethers, thioethers and organic and inorganic esters. Examples of polyols are glycerine, diglycerol, polyglycerol, pentaerythritol, polyglycerol ethoxylate, ethylene glycol, polyethylene glycol, 1,2-propanediol, 1,3-propanediol, 1,4-butanediol, neopentylglycol, sorbitol monoacetate, sorbitol diacetate, sorbitol monoethoxylate, sorbitol diethoxylate, and mixtures thereof. In a preferred embodiment the starch is destructured in the presence of glycerol or a mixture of plasticisers comprising glycerol, more preferably containing between 2 and 90% by weight of glycerol. Preferably the destructured and cross-linked starch according to this invention comprises between 1 and 40% by weight of plasticisers with respect to the weight of the starch.

When present the starch in the composition of layer B is preferably in the form of particles having a circular or elliptical cross section or in any event a cross-section similar to an ellipse having a mean arithmetic diameter less than 1 micron, and more preferably of less than 0.5 µm mean diameter, measured using the major axis of the particle.

The composition of layer B comprises 1-40% by weight, preferably 2-30% by weight, with respect to the sum of components i.-v., of at least one polyhydroxyalkanoate (component iii.), preferably selected from the group consisting of polyesters of lactic acid, poly-ε-caprolactone, polyhydroxybutyrate, polyhydroxybutyrate-valerate, poly-hydroxybutyrate propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate. Preferably the said polyhydroxyalkanoate comprises at least 80% by weight of one or more polyesters of lactic acid.

In a preferred embodiment the lactic acid polyesters are selected from the group comprising poly-L-lactic acid, poly-D-lactic acid, the poly-D-L-lactic acid stereo complex, copolymers comprising more than 50% by moles of the said lactic acid polyesters, or mixtures thereof.

Particularly preferred are lactic acid polyesters containing at least 95% by weight of repetitive units deriving from L-lactic or D-lactic acid or combinations thereof, having an Mw molecular weight of more than 50000 and a shear viscosity of between 50 and 500 Pa·s, preferably 100-300 Pa·s (measured according to standard ASTM D3835 at T=190° C., shear rate=1000 s$^1$, D=1 mm, L/D=10).

In a particularly preferred embodiment of the invention the lactic acid polyester comprises at least 95% by weight of units deriving from L-lactic acid, ≤5% of repetitive units deriving from D-lactic acid, has a melting point within the range 135-180° C., a glass transition temperature (Tg) in the range 55-65° C. and an MFR (measured in accordance with standard ISO 1133-1 at 190° C. and 2.16 kg) within the range 1-50 g/10 min. Commercial examples of lactic acid polyesters having these properties are for example the products of the Ingeo™ Biopolymer 4043D, 3251D and 6202D make.

In the composition of layer B there is present 0-15% by weight, with respect to the sum of components i.-v., of at least one inorganic filler (component iv.), which is preferably selected from kaolin, barytes, clay, talc, calcium and magnesium, iron and lead carbonates, aluminium hydroxide, diatomaceous earth, aluminium sulfate, barium sulfate, silica, mica, titanium dioxide, wollastonite.

In a preferred embodiment of this invention the inorganic filler in the composition of layer B comprises talc, calcium carbonate or their mixtures, present in the form of particles having a mean arithmetic diameter of less than 10 microns measured in relation to the major axis of the particles. It has in fact been discovered that fillers of the abovementioned type which are not characterised by the said mean arithmetic diameter prove the disintegratability characteristics significantly less during the industrial composting of objects containing them.

In the composition of layer B there is also present from 0 to 5% by weight, preferably 0-0.5% by weight, with respect to the sum of components i.-v., of at least one cross-linking agent and/or chain extender (component v.) in order to improve stability to hydrolysis.

The said cross-linking agent and/or chain extender is selected from compounds having two and/or multiple functional groups including isocyanate, peroxide, carbodiimide, isocyanurate, oxazoline, epoxy, anhydride or divinylether groups or mixtures thereof. Preferably the cross-linking agent and/or chain extender comprises at least one compound having two and/or multiple functional groups including isocyanate groups. More preferably the cross-linking agent and/or chain extender comprises at least 25% by weight of one or more compounds having two and/or multiple functional groups including isocyanate groups. Particularly preferred are mixtures of compounds having two and/or multiple functional groups including isocyanate groups with compounds having two and/or multiple functional groups including epoxy groups, even more preferably comprising at least 75% by weight of compounds having two and/or multiple functional groups including isocyanate groups.

The compounds having two and multifunctional groups including isocyanate groups are preferably selected from p-phenylene diisocyanate, 2,4-toluene diisocyanate, 2,6-toluene diisocyanate, 4,4-diphenylmethane-diisocyanate, 1,3-phenylene-4-chloro diisocyanate, 1,5-naphthalene diisocyanate, 4,4-diphenylene diisocyanate, 3,3'-dimethyl-4,4-diphenylmethane diisocyanate, 3-methyl-4,4'-diphenylmethane diisocyanate, diphenylester diisocyanate, 2,4-cyclohexane diisocyanate, 2,3-cyclohexane diisocyanate, 1-methyl 2,4-cyclohexyl diisocyanate, 1-methyl 2,6-cyclohexyl diisocyanate, bis-(isocyanate cyclohexyl) methane, 2,4,6-toluene triisocyanate, 2,4,4-diphenylether triisocyanate, polymethylene-polyphenyl-polyisocyanates, methylene diphenyl diisocyanate, triphenylmethane triisocyanate, 3,3'ditolylene-4,4-diisocyanate, 4,4'-methylenebis (2-methyl-phenyl isocyanate), hexamethylene diisocyanate, 1,3-cyclohexylene diisocyanate, 1,2-cyclohexylene diisocyanate and their mixtures. In a preferred embodiment the compound containing isocyanate groups is 4,4-diphenylmethane-diisocyanate.

As far as the compounds having two and/or multiple functional groups including peroxide groups are concerned, these are preferably selected from benzoyl peroxide, lauroyl peroxide, isononanoyl peroxide, di-(t-butylperoxyisopropyl) benzene, t-butyl peroxide, dicumyl peroxide, alpha,alpha-di (t-butylperoxy)diisopropylbenzene, 2,5-dimethyl-2,5-di(t-butylperoxy)hexane, t-butyl cumyl peroxide, di-t-butylperoxide, 2,5-dimethyl-2,5-di(t-butylperoxy)hex-3-yne, di(4-t-butylcyclohexyl)peroxy dicarbonate, dicetyl peroxydicarbonate, dimyristyl peroxydicarbonate, 3,6,9-triethyl-3,6,9-trimethyl-1,4,7-triperoxonane, di(2-ethylhexyl) peroxydicarbonate and mixtures thereof.

The compounds having two and/or multiple functional groups including carbodiimide groups which are preferably used in the composition according to this invention are selected from poly(cyclooctylene carbodiimide), poly(1,4-dimethylencyclohexylene carbodiimide), poly(cyclohexylene carbodiimide), poly(ethylene carbodiimide), poly (butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetraisopropyl-diphenylene carbodiimide) (Stabaxol® D), poly(2,4,6-triisopropyl-1,3-phenylene carbodiimide) (Stabaxol® P-100), poly(2,6 diisopropyl-1,3-phenylene carbodiimide) (Stabaxol® P), poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'- diphenylmethane carbodiimide), poly(naphthylene carbodiimide), poly(isophorone carbodiimide), poly(cumene carbodiimide), p-phenylene bis(ethylcarbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and mixtures thereof.

Examples of compounds having two and multiple functional groups including epoxy groups which may advantageously be used in the composition according to this invention are all the polyepoxides from epoxidated oils and/or from styrene-glycidylether-methylmethacrylate or glycidylether-methylmethacrylate, included within a range of molecular weights between 1000 and 10000 and having an epoxide number per molecule within the range 1 to 30 and preferably between 5 and 25, the selected epoxies in the group comprising: diethyleneglycol diglycidylether, polyethyleneglycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxides, 1,4-cyclohaxanedimethanol diglycidyl ether, glycidyl 2-methylphenyl ether, glycerol propoxylatotriglycidyl ether, 1,4-butanediol diglycidyl ether, sorbitol polyglycidyl ether, glycerol diglycidyl ether, tetraglycidyl ethers of meta-xylenediamine and diglycidyl ether or bisphenol A and mixtures thereof.

Together with the compounds having two and multiple functional groups including isocyanate, peroxide, carbodiimide, isocyanurate, oxazoline, epoxy, anhydride and divinylether groups such as for example those described above, catalysts may also be used to raise the reactivity of the reactive groups. In the case of the polyepoxides, salts of fatty acids, even more preferably calcium and zinc stearates, may preferably be used.

In a particularly preferred embodiment of the invention the cross-linking agent and/or chain extender for the composition in layer B comprises compounds including isocyanate groups, preferably 4,4-diphenylmethane-diisocyanate, and/or containing carbodiimide groups, and/or containing epoxy groups, preferably of the styrene-glycidylether-methylmethacrylate type.

In layer B, in addition to component i.-v. mentioned above, one or more other components may also advantageously be present. In this case layer B comprises a composition comprising the components i.-v. and preferably one or more polymers which are not the same as components i., ii. and iii., of synthetic or natural origin, which may or may not be biodegradable, together with possibly one or more other components.

As far as the polymers which are not the same as components i., ii. and iii., of synthetic or natural origin, which may or may not be biodegradable, are concerned, these are advantageously selected from the group comprising vinyl polymers, diacid diol polyesters which are not the same as polyester i., polyamides, polyurethanes, polyethers, polyureas, polycarbonates and mixtures thereof.

Among the vinyl polymers those preferred are polyethylene, polypropylene, their copolymers, polyvinyl alcohol, polyvinyl acetate, polyethylvinyl acetate and polyethylene vinyl alcohol, polystyrene, chlorinated vinyl polymers, polyacrylates.

Among the chlorinated vinyl polymers, those which are intended to be included here, in addition to polyvinyl chloride are polyvinylidene chloride, polyethylene chloride, poly(vinyl chloride-vinyl acetate), poly(vinyl chloride-ethylene), poly(vinyl chloride-propylene), poly(vinyl chloride-styrene), poly(vinyl chloride-isobutylene) and copolymers in which polyvinyl chloride represents more than 50% by moles. The said polymers may be random, block or alternating copolymers.

As far as the polyamides in the composition according to this invention are concerned, these are preferably selected from the group comprising polyamide 6 and 6,6, polyamide 9 and 9,9, polyamide 10 and 10,10, polyamide 11 and 11,11, polyamide 12 and 12,12 and their combinations of the 6/9, 6/10, 6/11 and 6/12 type, their mixtures and both random and block copolymers.

Preferably the polycarbonates of the composition according to this invention are selected from the group comprising polyalkylene carbonates, more preferably polyethylene carbonates, polypropylene carbonates, polybutylene carbonates, their mixtures and random and block copolymers.

Among the polyethers, those preferred are those selected from the group consisting of polyethylene glycols, polypropylene glycols, polybutylene glycols, their copolymers and their mixtures having molecular weights from 70000 to 500000.

As far as the diacid diol polyesters which are not the same as the polyester i. in layer B are concerned, these preferably comprise:
i) a dicarboxylic component comprising, with respect to the total dicarboxylic component:
   i1) 20-100% by moles of units deriving from at least one aromatic dicarboxylic acid,
   i2) 0-80% by moles of units deriving from at least one saturated aliphatic dicarboxylic acid,
   i3) 0-5% by moles of units deriving from at least one unsaturated aliphatic dicarboxylic acid;
j) a diol component comprising, with respect to the total diol component:
   j1) 95-100% by moles of units deriving from at least one saturated aliphatic diol;
   j2) 0-5% by moles of units deriving from at least one unsaturated aliphatic diol.

Preferably aromatic dicarboxylic acids i1, saturated aliphatic dicarboxylic acids i2, unsaturated aliphatic dicarboxylic acids i3, saturated aliphatic diols j1 and unsaturated aliphatic diols j2 for the said polyesters are selected from those described above for the polyester i in layer B according to this invention.

In addition to the abovementioned components the composition in layer B preferably also comprises at least one other component selected from the group consisting of plasticisers, UV stabilisers, lubricants, nucleating agents, surfactants, antistatic agents, pigments, flame-retardant agents, compatibilising agents, lignin, organic acids, antioxidants, anti-mould agents, waxes, process coadjuvants and polymer components preferably selected from the group consisting of vinyl polymers, diacid diol polyesters which are not the aliphatic-aromatic polyesters described above, polyamides, polyurethanes, polyethers, polyureas or polycarbonates.

As far as the plasticisers are concerned, there are preferably present in the composition of layer B according to this invention, in addition to the plasticisers preferably used for preparation of the destructured starch described above, one or more plasticisers selected from the group consisting of phthalates, such as for example diisononyl phthalate, trimellitates, such as for example esters of trimellitic acid with $C_4$-$C_{20}$ monoalcohols preferably selected from the group consisting of n-octanol and n-decanol, and aliphatic esters having the following structure:

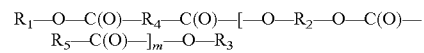

in which:
- $R_1$ is selected from one or more groups comprising H, linear and branched saturated and unsaturated alkyl residues of the $C_1$-$C_{24}$ type, polyol residues esterified with $C_1$-$C_{24}$ monocarboxylic acids;
- $R_2$ comprises —$CH_2$—$C(CH_3)_2$-$CH_2$— and $C_2$-$C_5$ alkylene groups, and comprises at least 50% by moles of the said —$CH_2$—$C(CH_3)_2$-$CH_2$— groups;
- $R_3$ is selected from one or more groups comprising H, linear and branched saturated and unsaturated alkyl residues of the $C_1$-$C24$ type, polyol residues esterified with C1-C24 monocarboxylic acids;
- $R_4$ and $R_5$ are the same or different, comprise one or more $C_2$-$C_{22}$, preferably $C_2$-$C_{11}$, more preferably $C_4$-$C_9$ alkylenes, and comprise at least 50% by moles of C7 alkylenes.
- m is a number of between 1 and 20, preferably 2-10, more preferably 3-7. Preferably, in the said esters at least one of the groups $R_1$ and/or $R_3$ comprises, preferably in quantities ≥10% by moles, more preferably ≥20%, even more preferably ≥25% by moles with respect to the total quantity of $R_1$ and/or $R_3$ groups, polyol residues esterified with at least one $C_1$-$C_{24}$ monocarboxylic acid selected from the group consisting of stearic acid, palmitic acid, 9-ketostearic acid, 10-ketostearic acid and mixtures thereof. Examples of aliphatic esters of this type are described in Italian Patent Application MI2014A000030 and in PCT Applications PCT/EP2015/050336, PCT/EP2015/050338.

When present in layer B the selected plasticisers are preferably present up to 10% by weight with respect to the total weight of the composition of layer B itself.

The lubricants are preferably selected from esters and metal salts of fatty acids such as for example zinc stearate, calcium stearate, aluminium stearate and acetyl stearate. Preferably the composition of layer B according to this invention comprises up to 1% by weight of lubricants, more preferably up to 0.5% by weight with respect to the total weight of the composition of layer B.

Examples of nucleating agents include the sodium salt of saccharine, calcium silicate, sodium benzoate, calcium titanate, boron nitride, isotactic polypropylene, or low molecular weight PLA. These additives are preferably added in quantities up to 10% by weight and more preferably between 2 and 6% by weight with respect to the total weight of the composition.

Pigments may also be added if necessary, for example titanium dioxide, clays, copper phthalocyanine, silicates, iron oxide and hydroxides, carbon black and magnesium oxide. These additives are preferably added up to 10% by weight.

Preferably, the polyesters of the layers A and/or B of the multilayer film according to the present invention comprise at least 10% by moles of aromatic dicarboxylic acids and/or aliphatic dicarboxylic acids and/or diols of renewable origin. According to the present invention, the products that can be considered of renewable origin are those obtained from sources that, by their very nature, are regenerable and inexhaustible on the time scale of human life and the use of which consequently does not negatively affect the availability of natural resources for future generations. Examples of monomers of renewable origin are sebacic acid, succinic acid, 2,5-furandicarboxylic acid, azelaic acid, 1,4-butanediol.

The multilayer film according to this invention comprises at least one layer A and at least one layer B, preferably characterised by a mutual relationship selected from A/B and A/B/A, wherein the layer A and layer B are different from each other. The multilayer film according to this invention may advantageously comprise one or more layers A and one or more layers B, as well as further layers, such as for example tie layers or barrier layers, or metal films. In the multilayer film according to this invention the ratio between the totality of layers A and the totality of layers B is between 0.05 and 1.2. Preferably, in the multilayer film according to this invention the ratio between the totality of layers A and the totality of layers B is between 0.1 and 0.6. The multilayer film according to this invention with an arrangement of the layers of the A/B and preferably A/B/A type having a total thickness in which the sum of the thicknesses of the A layers is less than the thickness of the B layers, preferably less than B/2, and more preferably less than B/3. The multilayer film according to this invention advantageously has a total thickness of less than 50 microns, more preferably less than 15 microns, even more preferably less than 13 microns.

The thickness of the layers can advantageously be measured using the electron microscope on the fracture surface in liquid nitrogen.

Further layers, arranged in an intermediate position with respect to layers A and B (arrangement A/C/B, where C is a further layer) or a non-intermediate position (arrangement A/B/C or C/A/B, where C is a further layer) may also be present however.

The multilayer film according to this invention may be produced according to any of those processes known in the art, through for example a coextrusion, coating/spreading or lamination process. In a preferred embodiment the multilayer film according to this invention can be obtained through a coextrusion process, preferably associated with a bubble film-forming process.

The equipment and specific process conditions, for example for coextrusion and film-forming, for the production of multilayer film according to this invention depend on the composition and number of layers in which it is intended to produce the multilayer film. Thanks to the specific combination of components and layers the multilayer film according to this invention has the characteristic that it allows optimum balancing between high level biodegradation properties, mechanical properties, in particular a high elastic modulus, and appreciable optical transparency properties. This renders it particularly suitable for the production of an extensive range of articles such as for example packaging of various kinds, in particular bags for carrying of goods and bags for food packaging such as bags for fruit and vegetables comprising the said multilayer film.

As far as optical properties are concerned, transmittance values of more than 90%, more preferably more than 91%, Haze values of less than 65%, more preferably less than 55% and clarity over 20%, more preferably over 40% (measured according to standard ASTM D1003), which allow the multilayer film according to this invention to be particularly suitable for the applications mentioned above, are particularly preferred.

The multilayer film according to the present invention is biodegradable under home composting conditions according to UNI11355. Preferably, the said multilayer film is biodegradable under home composting conditions according to UNI1135, when characterized by a total thickness of less than 15 microns, preferably less than 13 microns.

The multilayer film according to the present invention finds application in the production of mulching films thanks to their high degree of disintegration at low temperatures, accompanied by strong mechanical properties, being therefore capable of effectively performing their action of protecting the ground, for example impeding the growth of weeds and reducing water consumption, without the need to be removed after use.

Preferably, disintegration of said mulching films comprising the composition according to the present invention takes place in the ground, at temperatures of 28° C.±2, and the degree of disintegration could be determined visibly through periodical observations. Preferably, the multilayer film according to the present invention will no longer be visible after 180 days.

This invention will now be illustrated on the basis of a number of examples which are not intended to be limiting thereupon.

Example 1—Two-Layer Film Having an A/B Arrangement

Preparation of Composition A (layer A): 29.7 kg/h poly (butylene adipate-co-butylene terephthalate), having a terephthalic acid content of 47.5% by moles with respect to the total dicarboxylic component, MFR 11 g/10 min (at 190° C., 2.16 kg) and acidity 50 meq/kg, 9.1 kg/h of Ingeo 3251D polylactic acid ("PLA"), MFR 58 g/10 min (at 190° C., 2.16 kg), 1.0 kg/h of masterbatch comprising 10% by weight of Joncryl ADR4368CS (styrene-glycidylether-methylmethacrylate copolymer) and 90% of Ingeo 4043D polylactic acid ("PLA"), 0.2 kg/h of masterbatch comprising 10% Crodamide SR Bead manufactured by Croda and 90% of poly(butylene adipate-co-butylene terephthalate) were fed to an OMC EBV60/36 twin screw extruder operating under the following conditions:

Screw diameter (D)=58 mm;
L/D=36;
Screw rotation speed=140 rpm;
Thermal profile=60-150-180-210×4-150×2° C.;
Throughput: 40 kg/h;
Vacuum degassing in zone 8 out of 10.

The granules so obtained had an MFR (190° C., 2.16 kg in accordance with standard ISO 1133-1 "Plastics-determination of the melt mass-flow rate (MFR) and melt volume flow rate (MVR) of thermoplastics—Part 1: Standard method") of 7 g/10 minutes. Preparation of Composition B (layer B): 28.3 kg/h of poly(butylene adipate-co-butylene azelate-co-butylene terephthalate) having an azelaic acid content of 30% by moles with respect to the sum of adipic acid and azelaic acid, and a terephthalic acid content of 48.3% by moles with respect to the total for the dicarboxylic component, MFR 5 g/10 min (at 190° C., 2.16 kg) and acidity 47 meq/kg, 1.4 kg/h of Ingeo 4043D polylactic acid ("PLA"), MFR 2.7 g/10 min (at 190° C., 2.16 kg), 16 kg/h of thermoplastic maize starch, 0.1 kg/h of Almatex PD-4440 produced by the Anderson Development Company, 0.1 kg/h of Crodamide ER microbead manufactured by Croda and 0.1 kg/h of Carbodilite HMV15CA manufactured by Nisshinbo Chemical Inc. were fed to an OMC EBV60/36 model twin screw extruder operating under the following conditions:

Screw diameter (D)=58 mm;
L/D=36;
Screw rotation speed=160 rpm;
Thermal profile=60-150-180-210×4-150×2° C.;
Throughput: 46.1 kg/h;
Vacuum degassing in zone 8 out of 10.

The granules so obtained had an MFR (160° C., 5 kg in accordance with standard ISO 1133-1 "Plastics—determination of the melt mass-flow rate (MFR) and melt volume flow rate (MVR) of thermoplastics—Part 1: Standard method") of 2.4 g/10 minutes.

Composition A and Composition B were then fed simultaneously to a coextruder to form a two-layer blown film having an A/B arrangement. For this purpose Composition A was fed at a throughput of 3.3 kg/h to an extruder with a screw diameter of 35 mm and an L/D of 30 operating at 13 rpm with a 100-170×4 thermal profile. In parallel Composition B was fed through two extruders, the first characterised by a screw diameter of 35 mm with an L/D of 30 operating at 12 rpm with a 80-154×4 thermal profile operating at 3.3 kg/h and a second characterised by a screw diameter of 40 mm with an L/D of 30 operating at 74 rpm with an 80-145×4 thermal profile and a throughput of 28.3 kg/h. Once molten the two compositions were merged in the coextrusion-blowing head having a gap of 0.9 mm and an L/D 9 set at 170° C., feeding the multilayer structure to a film-forming process operating with a blowing ratio of 4.5 and a stretch ratio of 20.2.

The film so obtained (total 10 microns, 10% layer A, 90% layer B) was then characterised in terms of mechanical and optical properties (Table 1).

Example 2—Two-Layer Film Having an A/B/Arrangement

Composition A and Composition B according to Example 1 was simultaneously fed to a coextruder to form a three-layer blown film having an A/B/A arrangement. With this object Composition A was fed with a throughput of 3.3 kg/h to a first extruder having a screw diameter of 35 mm with an L/D of 30 operating at 14 rpm with a 100-170×4 thermal profile and with a throughput of 3.3 kg/h to a second extruder characterised by a screw diameter of 35 mm with an L/D of 30 operating at 13 rpm with a 100-170×4 thermal profile. Composition B was fed at 28.3 kg/h to an extruder having a screw diameter of 40 mm with an L/D of 30 operating at 74 rpm with a 80-154×4 thermal profile. Once molten the two compositions were merged in a coextrusion-blowing head with a gap of 0.9 mm and an L/D of 9 set at 170° C., feeding the multilayer structure to a film-forming process operating with a blowing ratio of 4.5 and a stretch ratio of 20.2.

The film so obtained (total 10 microns, 20% layer A, evenly distributed between the two layers, 80% layer B) was then characterised in terms of mechanical and optical properties (Table 1).

Example 3 (Comparative) Preparation of a Monolayer Film Comprising Composition B Composition B according to Example 1 was simultaneously fed to a coextruder to form a monolayer blown film having an B/B/B arrangement. With this object Composition B was fed with a throughput of 2.8 kg/h to a first extruder having a screw diameter of 35 mm with an L/D of 30 operating at 18 rpm with a 100-145×4 thermal profile and with a throughput of 24.3 kg/h to a second extruder characterised by a screw diameter of 40 mm with an L/D of 30 operating at 63 rpm with a 80-145×4 thermal profile and with a throughput of 2.8 kg/h to a third extruder characterised by a screw diameter of 35 mm with an L/D of 30 operating at 18 rpm with a 100-145×4. The coextrusion-blowing head has a gap of 0.9 mm and an L/D of 9 set at 145° C., feeding the monolayer structure to a film-forming process operating with a blowing ratio of 4.5 and a stretch ratio of 20.2.

The film so obtained (total 10 microns, 100% composition B) was then characterised in terms of mechanical and optical properties (Table 1).

Example 4—Two-Layer Film Having an A/B/A Arrangement

Preparation of Composition A (layer A): 31.4 kg/h of poly(butylene adipate-co-butylene terephthalate) having a terephthalic acid content of 47.5% by moles with respect to the total dicarboxylic component, MFR 11 g/10 min (at 190° C., 2.16 kg) and acidity 50 meq/kg, 7.6 kg/h of Ingeo 3251D polylactic acid ("PLA"), MFR 58 g/10 min (at 190° C., 2.16 kg), 0.8 kg/h of masterbatch comprising 10% by weight of Joncryl ADR4368CS (styrene-glycidylether-methylmethacrylate copolymer) and 90% of Ingeo 4043D polylactic acid ("PLA"), 0.2 kg/h of masterbatch comprising 10% Crodamide SR Bead manufactured by Croda and 90% of poly(butylene adipate-co-butylene terephthalate) were fed to an OMC EBV60/36 model twin screw extruder operating under the conditions specified for layer A in Example 1.

The granules so obtained had an MFR (190° C., 2.16 kg in accordance with standard ISO 1133-1) of 7.5 g/10 minutes.

Composition A according to Example 4 and Composition B according to Example 1 were simultaneously fed to a coextruder to form a three-layer blown film having an A/B/A arrangement. With this object Composition A was fed with a throughput of 2.9 kg/h to a first extruder having a screw diameter of 35 mm with an L/D of 30 operating at 11 rpm with a 60-170×4 thermal profile and with a throughput of 2.9 kg/h to a second extruder characterised by a screw diameter of 35 mm with an L/D of 30 operating at 11 rpm with a 60-170×4 thermal profile. Composition B was fed at 24.2 kg/h to an extruder having a screw diameter of 40 mm with an L/D of 30 operating at 64 rpm with a 80-145×4 thermal profile. Once molten the two compositions were merged in a coextrusion-blowing head with a gap of 0.9 mm and an L/D 9 set to 170° C., feeding the multilayer structure to a film-forming process operating with a blowing ratio of 4.5 and a stretch ratio of 20.2.

The film so obtained (total 10 microns, 20% layer A evenly distributed between the two layers, 80% layer B) was then characterised in terms of mechanical and optical properties (Table 1).

Example 5—Two-Layer Film Having an A/B/A Arrangement

Preparation of Composition A (layer A): 16 Kg/h poly (butylene sebacate), MFR 3.7 g/10 min (at 150° C., 2.16 kg) and acidity 25 meq/Kg, 20 kg/h poly(butylene adipate-co-butylene terephthalate), having a terephthalic acid content of 47.5% by moles with respect to the total dicarboxylic component, MFR 5.1 g/10 min (at 190° C., 2.16 kg) and acidity 37 meq/Kg, 4 kg/h of Ingeo 4043D polylactic acid ("PLA"), MFR 2.5 g/10 min (at 190° C., 2.16 kg), 0.1 kg/h of Crodamide ER microbead manufactured by Croda were fed to an OMC EBV60/36 twin screw extruder operating under the following conditions:
Screw diameter (D)=58 mm;
L/D=36;
Screw rotation speed=160 rpm;
Thermal profile=60-120-160×5-150×2° C.;
Throughput: 40.1 kg/h;
Vacuum degassing in zone 8 out of 10.

The granules so obtained had an MFR (190° C., 2.16 kg in accordance with standard ISO 1133-1 "Plastics—determination of the melt mass-flow rate (MFR) and melt volume flow rate (MVR) of thermoplastics—Part 1: Standard method") of 6 g/10 minutes.

Composition A according to Example 5 and Composition B according to Example 1 were then fed simultaneously to a coextruder to form a three-layer blown film having an A/B/A arrangement. For this purpose Composition A was fed at a throughput of 2.8 kg/h to an extruder with a screw diameter of 35 mm and an L/D of 30 operating at 11 rpm with a 60-125×4 thermal profile. Composition B was fed through an extruder characterised by a screw diameter of 40 mm with an L/D of 30 operating at 66 rpm with a 80-145×4 thermal profile. Once molten the two compositions were merged in the coextrusion-blowing head having a gap of 0.9 mm and an L/D 9 set at 145° C., feeding the multilayer structure to a film-forming process operating with a blowing ratio of 4.5 and a stretch ratio of 20.2.

The film so obtained (total 10 microns, 20% layer A, 80% layer B) was then characterised in terms of mechanical and optical properties (Table 1).

Example 6—Two-Layer Film Having an A/B/A Arrangement

Preparation of Composition A (layer A): poly(butylene succinate-co-butylene azelate) having an azelaic acid content of 25% by moles with respect to the total dicarboxylic component, MFR 6 g/10 min (at 190° C., 2.16 kg) and acidity 46 meq/kg.

Composition A according to Example 6 and Composition B according to Example 1 were simultaneously fed to a coextruder to form a three-layer blown film having an A/B/A arrangement. With this object Composition A was fed with a throughput of 2.8 kg/h to a first extruder having a screw diameter of 35 mm with an L/D of 30 operating at 12 rpm with a 60-120×4 thermal profile and with a throughput of 2.8 kg/h to a second extruder characterised by a screw diameter of 35 mm with an L/D of 30 operating at 12 rpm with a 60-120×4 thermal profile. Composition B was fed at 24.3 kg/h to an extruder having a screw diameter of 40 mm with an L/D of 30 operating at 63 rpm with a 80-145×4 thermal profile. Once molten the two compositions were merged in a coextrusion-blowing head with a gap of 0.9 mm and an L/D 9 set to 145° C., feeding the multilayer structure to a film-forming process operating with a blowing ratio of 4.5 and a stretch ratio of 16.8.

The film so obtained (total 12 microns, 20% layer A evenly distributed between the two layers, 80% layer B) was then characterised in terms of mechanical and optical properties (Table 1).

Example 7—Two-Layer Film Having an A/B/A Arrangement

Preparation of Composition A (layer A): poly(butylene adipate-co-butylene terephthalate) having a terephthalic acid content of 47.5% by moles with respect to the total dicarboxylic component, MFR 3.9 g/10 min (at 190° C., 2.16 kg) and acidity 33 meq/kg.

Composition A according to Example 7 and Composition B according to Example 1 were simultaneously fed to a coextruder to form a three-layer blown film having an A/B/A arrangement. With this object Composition A was fed with a throughput of 2.8 kg/h to a first extruder having a screw diameter of 35 mm with an L/D of 30 operating at 16 rpm with a 60-145×4 thermal profile and with a throughput of 2.8 kg/h to a second extruder characterised by a screw diameter of 35 mm with an L/D of 30 operating at 16 rpm with a 60-145×4 thermal profile. Composition B was fed at 24.3 kg/h to an extruder having a screw diameter of 40 mm with an L/D of 30 operating at 63 rpm with a 80-145×4 thermal profile. Once molten the two compositions were merged in a coextrusion-blowing head with a gap of 0.9 mm and an L/D 9 set to 145° C., feeding the multilayer structure to a film-forming process operating with a blowing ratio of 3.6 and a stretch ratio of 25.2.

The film so obtained (total 10 microns, 20% layer A evenly distributed between the two layers, 80% layer B) was then characterised in terms of mechanical and optical properties (Table 1).

TABLE 1

| | FILM TENSILE STRENGTH ASTM D882 (23° C. 55% RH-Vo 50 mm/min) | | | | Elmendorf tear ASTM D1922 (23° C.-55% RH) | | OPTICAL PROPERTIES ASTM D1003 | | |
|---|---|---|---|---|---|---|---|---|---|
| | $\square_b$ (MPa) | $\square_b$ (%) | E (MPa) | $En_b$ (Kj/m$^2$) | Direction | Force (N/mm) | TRASM % | HAZE % | CLARITY % |
| Example 1 (10 micron) | 24 | 874 | 334 | 2559 | MD TD | 107 40 | 92 | 88 | 27 |
| Example 2 (10 micron) | 25 | 320 | 355 | 3003 | MD TD | 112 40 | 92 | 38 | 60 |
| Example 3 comparative (10 micron) | 30 | 315 | 243 | 3547 | MD TD | 161 309 | 92 | 98 | 8 |
| Example 4 (10 micron) | 32 | 351 | 386 | 4182 | MD TD | 127 78 | 92 | 31 | 61 |
| Example 5 (10 micron) | 30 | 291 | 332 | 3425 | MD TD | 157 214 | 93 | 61 | 31 |
| Example 6 (12 micron) | 28 | 335 | 243 | 3550 | MD TD | 173 203 | 93 | 46 | 34 |
| Example 7 (10 micron) | 44 | 331 | 298 | 5254 | MD TD | 98 258 | 92 | 46 | 41 |

The invention claimed is:

1. A multilayer film comprising at least one first layer A and at least one second layer B, in which layers A and B have a mutual A/B/A arrangement, wherein the layer A and layer B are different from each other, in which layer A comprises an aliphatic and/or aliphatic-aromatic biodegradable polyester or a polyvinyl alcohol or copolymers thereof and does not contain starch, and in which layer B comprises:
   i) 30-95% by weight, with respect to the sum of components i-v, of at least one polyester comprising:
      a) a dicarboxylic component containing with respect to the total dicarboxylic component:
         a1) 35-70% by moles of units deriving from at least one aromatic dicarboxylic acid,
         a2) 65-30% by moles of units deriving from at least one saturated aliphatic dicarboxylic acid, and
         a3) 0-5% by moles of units deriving from at least one unsaturated aliphatic dicarboxylic acid; and
      b) a diol component comprising with respect to the total diol component:
         b1) 95-100% by moles of units deriving from at least one saturated aliphatic diol, and
         b2) 0-5% by moles of units deriving from at least one unsaturated aliphatic diol;
   ii) 0.1-50% by weight, with respect to the sum of components i-v, of at least one polymer of natural origin;
   iii) 1-40% by weight, with respect to the sum of components i-v, of at least one polyhydroxy alkanoate;
   iv) 0-15% by weight, with respect to the sum of components i-v, of at least one inorganic filler; and
   v) 0-5% by weight, with respect to the sum of components i-v, of at least one cross-linking agent and/or chain extender comprising at least one compound having two and/or multiple functional groups selected from the group consisting of isocyanate, peroxide, carbodiimide, isocyanurate, oxazoline, epoxide, anhydride divinylether groups and mixtures thereof;
   wherein the at least one saturated aliphatic dicarboxylic acid of component a2 of the polyester in layer B comprises at least 50% by moles of a mixture of adipic acid and azelaic acid.

2. The multilayer film according to claim 1, in which the aliphatic-aromatic polyester in layer A comprises:
   c) a dicarboxylic component comprising with respect to the total dicarboxylic component:
      c1) 35-70% by moles of units deriving from at least one aromatic dicarboxylic acid,
      c2) 65-30% by moles of units deriving from at least one saturated aliphatic dicarboxylic acid, and
      c3) 0-5% by moles of units deriving from at least one unsaturated aliphatic dicarboxylic acid; and
   d) a diol component comprising with respect to the total diol component:
      d1) 95-100% by moles of units deriving from at least one saturated aliphatic diol, and
      d2) 0-5% by moles of units deriving from at least one unsaturated aliphatic diol.

3. The multilayer film according to claim 2, in which the saturated aliphatic dicarboxylic acids in component c2 comprise mixtures comprising at least 50% by moles of at least one acid selected from succinic acid, adipic acid, azelaic acid, sebacic acid, brassylic acid, their C1-C24 esters and mixtures thereof.

4. The multilayer film according to claim 3, in which the saturated aliphatic dicarboxylic acids in component c2 are selected from adipic acid and azelaic acid or mixtures thereof.

5. The multilayer film according to claim 1, in which in addition to the aliphatic and/or aliphatic-aromatic polyester in layer A, the layer A comprises 1-40% by weight with respect to the total for layer A of at least one polyhydroxy alkanoate.

6. The multilayer film according to claim 1, characterized by transmittance values of more than 90%, Haze values of less than 65%, and clarity over 20%, measured according to standard ASTM D1003.

7. The multilayer film according to claim 1, said film being biodegradable under home composting conditions according to UNI 11355.

8. A packaging comprising the multilayer film according to claim 1.

9. The packaging according to claim 8, being selected from bags for the carrying of goods and bags for food packaging.

10. A bag for fruit and vegetables according to claim 9.

11. A mulch film comprising the multilayer film according to claim 1.

12. The multilayer film according to claim 2, in which in addition to the aliphatic and/or aliphatic-aromatic polyester in layer A, the layer A comprises 1-40% by weight with respect to the total for layer A of at least one polyhydroxy alkanoate.

13. The multilayer film according to claim 3, in which in addition to the aliphatic and/or aliphatic-aromatic polyester in layer A, the layer A comprises 1-40% by weight with respect to the total for layer A of at least one polyhydroxy alkanoate.

14. The multilayer film according to claim 4, in which in addition to the aliphatic and/or aliphatic-aromatic polyester in layer A, the layer A comprises 1-40% by weight with respect to the total for layer A of at least one polyhydroxy alkanoate.

15. The multilayer film according to claim 1, wherein the mixture comprises azelaic acid in a quantity of between 5 and 40% by moles with respect to the sum of the adipic acid and the azelaic acid.

16. The multilayer film according to claim 1, in which the ii) at least one polymer of natural origin is in a quantity of between 5-40% by weight, with respect to the sum of components i-v.

17. The multilayer film according to claim 2, wherein the mixture comprises azelaic acid in a quantity of between 5 and 40% by moles with respect to the sum of the adipic acid and the azelaic acid.

18. The multilayer film according to claim 1, wherein the ii) at least one polymer of natural origin comprises starch.

* * * * *